United States Patent [19]

Sakamoto

[11] 4,206,485
[45] Jun. 3, 1980

[54] DIGITAL PHASE SERVO SYSTEM

[75] Inventor: Hitoshi Sakamoto, Zama, Japan

[73] Assignee: Sony Corporation, Tokyo, Japan

[21] Appl. No.: 844,988

[22] Filed: Oct. 25, 1977

Related U.S. Application Data

[63] Continuation of Ser. No. 814,084, Jul. 8, 1977, abandoned.

[51] Int. Cl.² ............................................. G11B 21/04
[52] U.S. Cl. ...................................... 360/70; 318/314; 318/608; 318/683
[58] Field of Search ................ 318/314, 318, 606, 608, 318/603, 683; 360/70

[56] References Cited

U.S. PATENT DOCUMENTS

| | | | |
|---|---|---|---|
| 3,206,665 | 9/1965 | Burlingham | 318/312 |
| 3,408,549 | 10/1968 | Shimabukuro | 318/314 |
| 3,495,152 | 2/1970 | Keiser et al. | 318/314 |
| 3,764,755 | 10/1973 | Yamashita et al. | 179/100.2 S |
| 3,934,269 | 1/1976 | Fujita et al. | 318/314 |

FOREIGN PATENT DOCUMENTS 1426820  3/1976  United Kingdom.

Primary Examiner—J. V. Truhe
Assistant Examiner—Eugene S. Indyk
Attorney, Agent, or Firm—Lewis H. Eslinger; Alvin Sinderbrand

[57] ABSTRACT

In a digital servo system suitable for controlling the rotational phase of a rotating body, such as, the rotary head drum of a video tape recorder (VTR), a binary output signal is provided, as a phase error signal, based upon the phase relation between a reference signal and a command signal showing the rotational phase of the rotary head drum, and such binary output signal is used to process a motor drive signal. Further, an analog servo system is used in association with the digital servo system to provide highly accurate correction of both high and low frequency phase errors.

21 Claims, 11 Drawing Figures

DIGITAL PHASE SERVO SYSTEM

RELATED APPLICATION

This application is a continuation of the co-pending U.S. Patent Application Ser. No. 814,084, filed July 8, 1977, now abandoned and having a common assignee herewith.

BACKGROUND OF THE INVENTION

1. Field of the Invention

This invention relates generally to a servo system for controlling the rotational phase of a rotating body, and is directed more particularly to a servo system which employs a digital servo loop to control the rotational phase of the rotary head drum in a VTR or video tape recorder.

2. Description of the Prior Art

The rotational phase of a rotary head drum used in a VTR can be servo controlled either by an analog servo circuit or by a digital servo circuit.

A typical analog phase control servo provides an analog signal, for instance, a DC voltage level, which corresponds to the difference in phase between a reference pulse and a pulse corresponding to the actual phase or rotational position of the rotary recording or reproducing heads. The analog signal is, in turn, used to control the speed or phase of the rotary heads.

A phase compensation circuit is included in the analog servo circuit, to emphasize the lower frequency phase deviations in order to compensate for the relatively slow phase changes caused by DC drift. This circuit normally incorporates an integration circuit, having a relatively long time constant, which is used for forming trapezoidal waves with relatively long slope portions that are sampled by a reference pulse. While the foregoing circuit compensates for relatively slow changes caused by DC drift, such a circuit has a poor transient response. The analog servo circuit is thus insensitive to the relatively fast phase fluctuations that produce jitter and picture instability. However, the analog servo circuits are generally quite simple in construction and inexpensive as compared with typical existing digital phase control servos.

A typical digital phase control servo circuit includes a means to digitize the difference in phase between a reference pulse and a control pulse generated in synchronization with the rotation of the rotary head drum of the VTR. The digitized signal so produced is used to control the speed or phase of the rotary head drum. Such a digital servo is able to respond to slow changes in phase without the necessity of the long-time-constant phase compensator. The transient response is improved substantially as compared with that of an analog servo circuit.

Unfortunately, in a digital phase servo, quantizing errors will occur, because the phase error is quantized to the nearest binary number, and the digital phase servo provides phase correction signals as a voltage stepped in discrete levels. Quantizing errors result when the voltage necessary for phase correction lies between two discrete voltage steps. Such quantizing error results in so-called quantizing noise which, in turn, produced jitter and degrades the reproduced picture quality in the VTR.

In order to suppress jitter caused by quantizing noise, it has been necessary to decrease the size of the stepped voltage levels by increasing the number of bits in the quantized phase correction signal. At the onset of rotation, or at any time that the recording head has scanned an unrecorded portion of tape and beings to scan a recorded portion of tape, the rotational phase of the head is likely to be severly out of phase with the reference signal. In order to bring the rotary heads into correct rotational phase while maintaining the desired reduced voltage level steps, it has been necessary to further increase the number of bits for responding to such large deviation.

For example, if high-speed phase compensation quality similar to that of an analog servo circuit is to be obtained, the bit number of the digitizing means must be on the order of fifteen to twenty bits, which adds considerably to the construction, and cost of the circuit.

OBJECTS AND SUMMARY OF THE INVENTION

Accordingly, it is an object of this invention to provide a simple and inexpensive servo system for controlling the rotational phase of a rotating body, such as the rotary recording and reproducing heads of a video tape recorder, and which is responsive to both low frequency phase errors, such as DC drift, and high frequency phase errors, such as jitter.

A more specific object of this invention is to provide an improved digital phase servo for controlling the phase of rotary recording and reproducing heads in a video tape recorder and which is responsive to low frequency phase fluctuations including those due to DC drift, and also responsive to high frequency phase fluctuations, such as those associated with jitter, while minimizing the effects of quantizing noise normally associated with digital servos, in order to provide improved picture stability in the video tape recorder.

In accordance with an aspect of this invention, a servo system is provided with a reference signal which is compared in phase with a command signal corresponding to the rotational phase of the rotating body to produce a binary level of "0" or "1" depending upon whether the rotational phase of the rotating body leads or lags the phase of the reference signal. The value of the binary level determines whether the count of a digital counter is increased or decreased and the phase of the rotating body is advanced or retarded at each revolution in dependence on the count of the digital counter. After the rotating body is brought into phase with the reference signal, a stable phase-locked condition is maintained. Once the correct phase is achieved, a frequency divider operates to prolong the interval between successive phase corrections, thereby minimizing the quantizing noise associated with the digital servo.

In one embodiment of the invention, the digital count of the counter controls a variable delay acting on pulses from a sweep pulse generator which indicate the rotational phase of the rotary recording and reproducing heads of a video tape recorder, and the pulses so delayed are applied to a drive control circuit which controls the speed of a motor used to drive the rotary heads, so that variation of the pulse delay effects the necessary phase correction to the rotary heads.

In another embodiment of the invention, an analog loop circuit is included to control the rotational phase of the rotary heads, with the result that relatively high frequency phase errors, such as jitter can be accurately controlled, and phase positioning can be carried out more precisely. The analog loop circuit, which serves as a rough phase lock servo, includes a phase comparator circuit, which detects the difference in phase between the reference signal and a sweep pulse indicating the rotational phase of the rotary heads and which has been delayed by the variable delay of the digital phase servo. The difference in phase between the reference signal and the variably delayed sweep pulse then controls the output frequency of a variable frequency oscillator, which in turn controls the phase signal used to drive a three-phase motor, thereby controlling the rotational phase of the rotary heads.

In this embodiment, the analog loop circuit has a short integrator time constant, and good responsiveness to high frequency phase fluctuations. The analog loop circuit functions to compensate for high frequency phase errors, and the digital phase servo provides accurate response to low frequency phase errors. Thus, it is advantageous to combine an analog loop circuit with a digital phase servo circuit.

The above, and other objects, features and advantages of the invention, will become apparent when the following description is read in conjunction with the accompanying drawings.

DETAILED DESCRIPTION OF THE PREFERRED EMBODIMENTS

Figure 1:
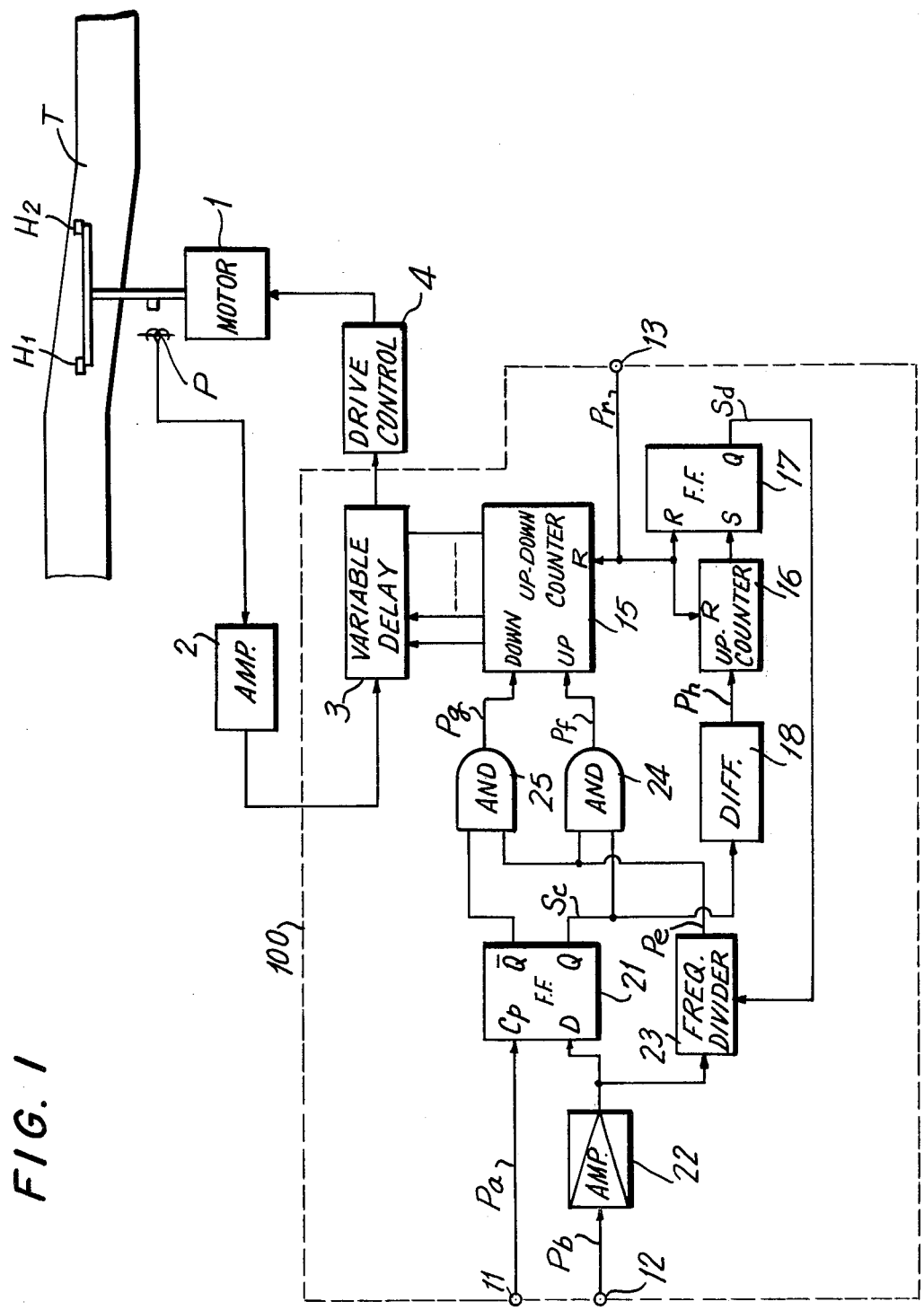
FIG. 1 is a block diagram showing an embodiment of a digital phase servo circuit according to this invention.

Referring to the drawings in detail, and initially to FIG. 1 thereof, a digital phase servo circuit 100 according to the invention is there shown applied to a video tape recorder or VTR in which a magnetic tape T is scanned by rotary heads $H_1$ and $H_2$ rotated by motor 1. A pulse generator P is associated with the shaft connecting motor 1 to heads $H_1$ and $H_2$ and generates a pulse $P_b$ in synchronism with the rotation of heads $H_1$ and $H_2$. Pulse $P_b$, after being amplified by an amplifier 2, is fed to a digitally operated phase shifter or variable delay 3. The delayed or phase shifted output of variable delay 3 is fed to a drive control circuit 4, which may be in the form of a digital-to-analog (D-A) converter. The output of circuit 4 is then applied to motor 1 as a driving signal for the latter. Thus, the rotational speed of motor 1 depends upon the amount of phase shifting effected by variable delay 3.

An input terminal 11 of digital phase servo 100 receives reference signals $P_a$ which are applied to a terminal $C_P$ of a flip-flop 21. Another input terminal 12 receives command signals $P_b$ which are transmitted through an amplifier 22 to a terminal D of flip-flop 21 and to a frequency divider or count down circuit 23. Frequency divider circuit 23 is inoperative as a frequency divider and, therefore provides derivative command signals $P_e$ to first and second AND-gates 24 and 25 for every occurrence of command signal $P_b$, so long as a binary output $S_d$ from a terminal Q of a flip-flop 17 is low or at "0" level. If the output $S_d$ is high or at the "1" level, frequency divider 23 becomes operative to provide derivative command signals $P_e$ at intervals corresponding to a succession of a predetermined number of command signals $P_b$.

Flip-flop 21 is shown to have output terminals Q and $\bar{Q}$ which are connected to inputs of first and second AND-gates 24 and 25, respectively. The output of first AND-gate 24, at which retarding phase correction signals $S_f$ appear, is connected to an UP terminal of an up/down counter 15, and the output of second AND-gate 25, at which advancing phase correction signals appears, is connected to a DWN terminal of up/down counter 15. The digital count of counter 15 is applied to variable delay 3, so that the latter delays the signal provided by pulse generator P to the drive control circuit 4 by an amount depending upon the count of up/down counter 15.

The Q terminal of flip-flop 21 provides a binary signal $S_c$ to differentiator 18 which, in response to changes in the level of a signal $S_c$, provides pulse $P_d$ to an up-counter 16. The output of up-counter 16 provides a signal to a set terminal S of flip-flop 17 to set the latter whenever a predetermined number of changes in binary level $S_c$ have occurred. Upon setting of flip-flop 17, its Q terminal provides the signal $S_d$ to frequency divider 23. Therefore, after there has been a predetermined number of changes in binary level $S_c$ of flip-flop 21, and until second flip-flop 17 is reset, frequency divider 23 provides one derivative command signal $P_e$ of each succession of a predetermined number of command pulses $P_b$.

The apparatus described above with reference to FIG. 1 operates as follows:

At the onset of a recording operation in response to actuation of a recording button (not shown), a reset signal $P_r$ is applied to input terminal 13 and thence to the R terminals of up/down counter 15, up-counter 16, and second flip-flop 17, so that counters 15 and 16 are thereby reset to zero and output $S_d$ of flip-flop 17 is a low level. Frequency divider 23 thus provides a derivative command signal $P_e$ for every occurrence of the command signal $P_b$. During the recording operation, command signal $P_b$ applied to input terminal 12 is the pulse provided by pulse generator P in synchronism with the rotation of the rotary heads $H_1$ and $H_2$. At the initiation of a reproducing operation, a reset signal $P_r$ is again applied to input terminal 13 and command signal $P_b$ received by terminal 12 is the vertical synchronizing signal derived from the reproduced video signal. Reference signal $P_a$ applied to input terminal 11 in either a recording or reproducing operation is provided by a clocking means (not shown) at a rate equal to one half the standard repetition frequency of vertical synchronizing signals of the video signals being recorded or reproduced.

Referring to FIGS. 2A and 2B, the phase of the recording head is initially shown to be ahead of the phase of the reference signal at time $t_1$, and the trailing edge of the command pulse $P_b$ (FIG. 2B) leads the trailing edge of reference pulse $P_a$ (FIG. 2A). So long as command pulse $P_b$ returns to zero before reference pulse $P_a$, flip-flop 21 will be in the "1" state, and Q output of flip-flop 21 will provide binary signal $S_c$ with a high or "1" level to AND-gate 24 and differentiator 18. At this time $t_1$, flip-flop 17 is still in its reset state, and the Q output of flip-flop 17 provides a low level or "0" signal to frequency divider 23. Thus, at time $t_1$, a derivative command signal $P_e$ is provided from divider 23 for each occurrence of command signal $P_b$, as shown in FIG. 2E. Each coincidence of "1" or high levels of signals $S_c$ and $P_e$, causes AND-gate 24 to provide a retarding phase control signal $P_f$ to input terminal UP of up/down counter 15 for increasing the count of the latter by one.

Each change in the count of up/down counter 15 causes variable delay 3 to increase the delay of the signal from pulse generator P by a predetermined amount, in turn, causing control circuit 4 to change the speed of the motor 1 so that the phase of the rotating heads $H_1$ and $H_2$ is changed by an incremental amount $\Delta\theta$, as shown in FIG. 2I. The foregoing phase correcting operation is continued upon every occurrence of command signal $P_b$, that is, upon every rotation of rotary heads $H_1$ and $H_2$, so long as the phase of the rotary heads is an advance of the phase of reference signal $P_a$. Thus, in the illustrated example, during the time $t_1$ to $t_2$, $S_c$ remains at the "1" level, and a retarding phase correction signal $P_f$ is provided to up/down counter 15 at each signal $P_e$. The drive control circuit 4 causes the phase of rotary heads $H_1$ and $H_2$ to be delayed by an additional amount $\Delta\theta$ at each rotation until the phase of the rotary heads $H_1$ and $H_2$ lags the phase of the reference signal $P_a$, as at the time $t_3$. At time $t_3$, the reference signal $P_a$ (FIG. 2A) returns to zero before the command signal $P_b$ (FIG. 2B) returns to zero, flip-flop 21 changes its state for providing signals $S_c$ (FIG. 2C), from its Q terminal, with the binary level "0" and an inverse binary level of "1" from its $\overline{Q}$ terminal.

The coincidence of the binary level "1" at output terminal $\overline{Q}$ of flip-flop 21 with a derivative command signal $P_e$ from frequency divider 23 causes AND-gate 25 to provide an advancing phase control signal $P_g$ (FIG. 2G) to input terminal DWN of up/down counter 15. This results in reducing the count of up/down counter 15 by one. The change in the count of counter 15 causes variable delay 3 to delay the signal to the drive control circuit 4 by lesser amount, and as a result the phase of the rotary heads is advanced by an amount $\Delta\theta$.

If, for example, at the time $t_4$, the phase of the rotary heads is once again ahead of the phase of the reference signal, the command signal $P_b$ remains at "1" level after the reference signal $P_a$ returns to zero, and the same sequence of operations is repeated, as at time $t_1$, so as to retard the phase of the rotary heads $H_1$ and $H_2$ by an amount $\Delta\theta$. Once the rotary heads $H_1$ and $H_2$ are brought into phase with the reference signal $P_a$, the digital phase servo circuit locks the phase to keep it from varying ahead of or behind the reference phase more than $\Delta\theta$.

Figure 2:
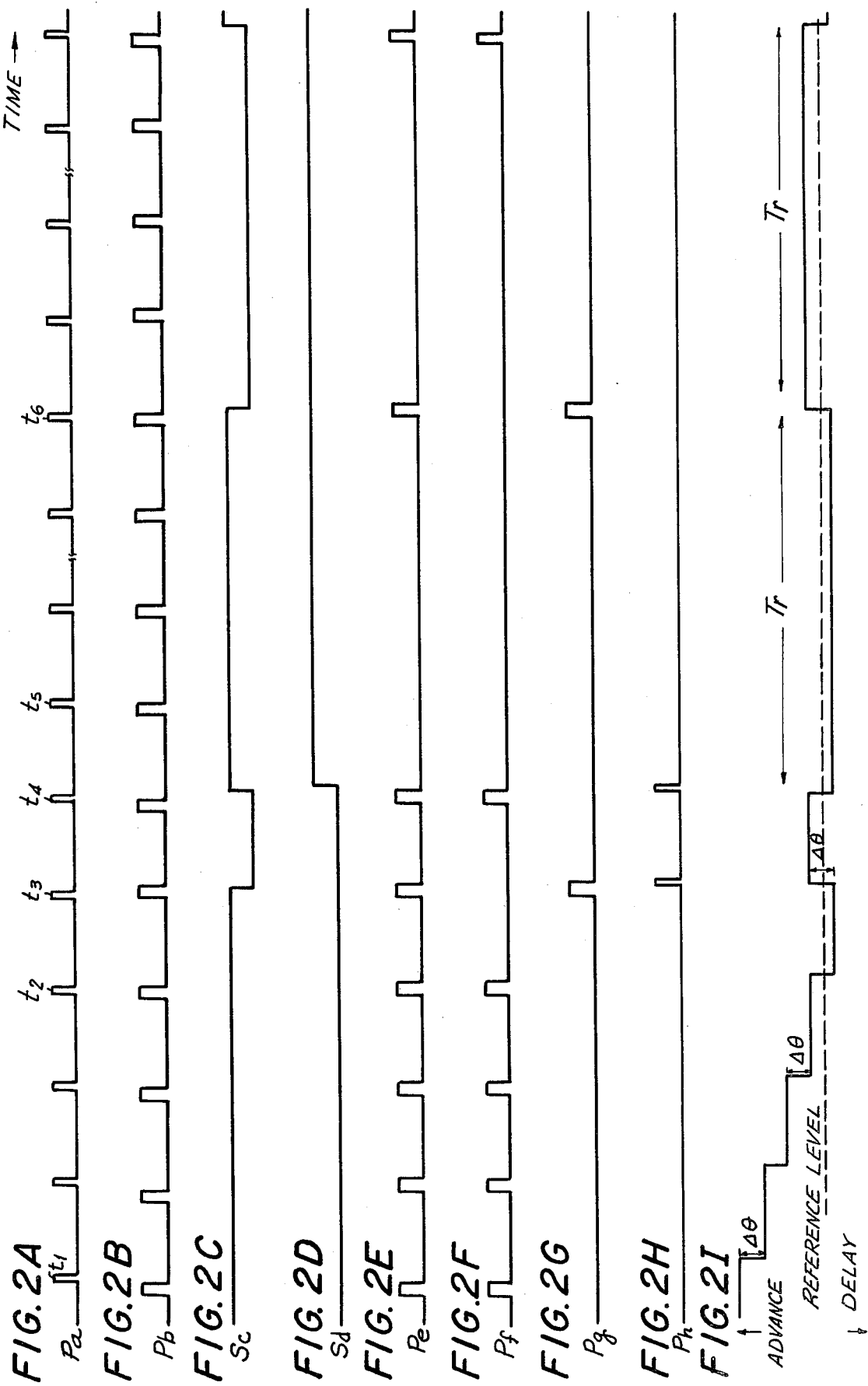
FIG. 2 shows various waveforms to which reference will be made in explaining the operation of the embodiment shown in FIG. 1.

Unfortunately, advancing and retarding the phase of the rotary heads by $\Delta\theta$ for successive rotations of the rotary heads, that is, every time command pulse $P_b$ is produced, can cause picture instability and jitter. Once the correct rotational phase is achieved, it is beneficial to decrease the frequency with which the phase of the rotary heads may be changed. To this end frequency divider 23 acts to prolong the interval between successive rotational phase correction signals $P_f$ or $P_g$ whenever flip-flop 21 has changed its state a predetermined number of times. In the example of FIG. 2, at time $t_3$ the phase of the reference signal $P_a$ (FIG. 2A) leads that of the command signal $P_b$, thus causing flip-flop 21 to change its state for causing signal $S_c$ to attain the level "0". At time $t_4$ the phase of reference signal $P_a$ lags that of command signal $P_b$, causing flip-flop 21 to again change its state, thereby causing binary signal $S_c$ to return to the level "1". Each time binary signal $S_c$ changes its level, differentiator 18 provides up-counter 16 with a signal $P_h$, (FIG. 2H), and up-counter 16, in turn, acts to set flip-flop 17 after a predetermined number of signals $P_h$ are provided by differentiator 18.

Up-counter 16 can be selected so as to set flip-flop 17 after counting any arbitrary number of signals $P_h$, but that number has been chosen to be two in the illustrated example. Therefore, at time $t_4$, flip-flop 21 changes state for the second time, and differentiator 18 has provided two signals $P_h$ to up-counter 16, thereby causing it to set flip-flop 17. The output terminal Q of flip-flop 17 provides binary signals $S_d$ to frequency divider 23 with the level "1" (FIG. 2D) and, in response thereto, frequency divider 23 provides a derivative command signal $P_e$ only after it has been provided with a predetermined series or number of command signals $P_b$. Because derivative command signals $P_e$ are provided to AND-gates 24 and 25 only once for each succession or series of a predetermined number of command signals $P_b$, for examples, as at the time $t_6$, the up/down counter 15, and the phase of the rotary heads $H_1$ and $H_2$ is changed, only at intervals corresponding to a predetermined number of rotations of the rotary head. The time interval between successive rotational phase corrections is indicated as $T_r$ on FIG. 2I. Thus, once the rotational phase of rotary heads $H_1$ and $H_2$ locks into phase with the reference signals $P_a$, the period between changes in rotational phase can be prolonged, thereby reducing jitter and picture instability. The amount $\Delta\theta$ by which the rotational phase of the rotary heads $H_1$ and $H_2$ is advanced or retarded, can also be made quite small in order to avoid jitter or instability.

In the embodiment described above with reference to FIG. 1, the command signals $P_b$ are the input to frequency divider 23. However, it will be apparent that the reference signals $P_a$, rather than command signals $P_b$, may be used as the input to frequency divider 23 in order to provide signals $P_e$ corresponding to a series or succession of a predetermined number of reference signals $P_a$.

Figure 3:
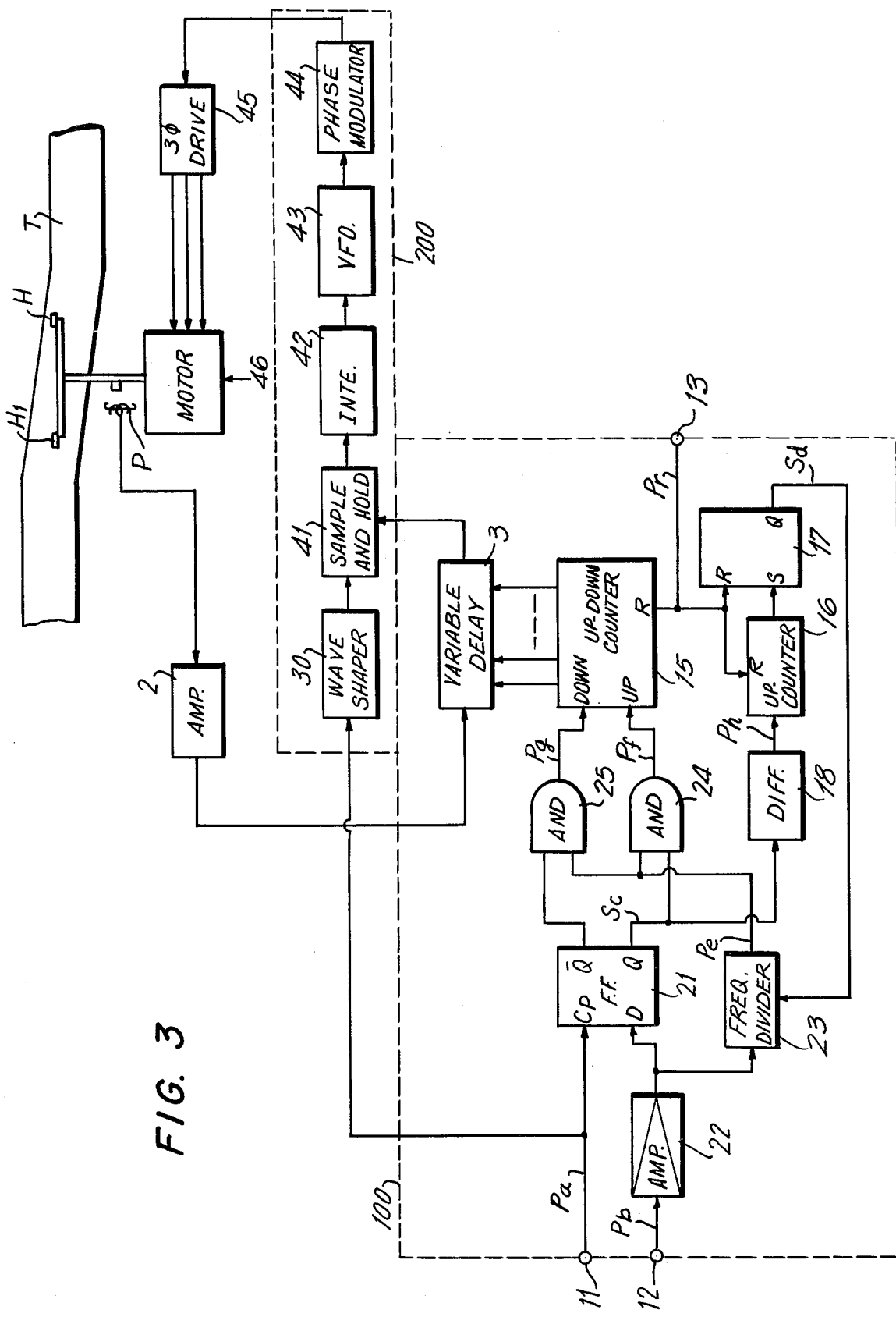
FIG. 3 is a block diagram showing a servo system according to another embodiment of the invention.

FIG. 3 shows another embodiment of the invention which includes a digital phase servo 100, described above with reference to FIG. 1, and an analog loop circuit 200 which cooperates with servo 100 to control the rotational phase of rotary heads $H_1$ and $H_2$.

Generally, in analog loop circuit 200, reference signals $P_a$ are compared with signals provided from pulse generator P in synchronization with rotary heads $H_1$ and $H_2$ and being passed through amplifier 2 and variable delay 3 of digital phase servo 100 on the basis of such comparison a phase correction signal is provided to a drive circuit 45, which may be a three-phase motor drive.

More particularly, reference signals $P_a$ are shown to be applied to a trapezoidal wave shaper 30 which provides a succession of corresponding sloping waveforms to a sample-and-hold circuit 41. The pulse or signal provided from pulse generator P and delayed in variable delay 3 an amount depending upon the count in up/down counter 15 is fed to sample-and-hold circuit 41 as the sampling pulse for the latter. The circuit 41 samples and holds, in response to the signal or pulse provided from variable delay 3, a segment of the slope portion of the sloping waveform from wave shaper 30. Sample-and-hold circuit 41 provides that segment of the sloping waveform to an integrator 42 which in turn provides a DC level. Such DC level is applied to a variable frequency oscillator 43, whose output frequency depends upon the DC level fed into it. The output of the variable frequency oscillator 43 is then applied to a phase modulator 44 to control the output phase of the latter provided to drive control circuit 45 to control the phase of motor 46. It will be apparent that, in the embodiment of FIG. 3, the wave shaper 30 and sample-and-hold circuit 41 function, in effect, as a phase comparator to compare the phase of the reference signal $P_a$ with the phase of the signal from delay 3.

While the embodiment of FIG. 3 shows drive control circuit 45 to be a three-phase motor drive, and motor 46 to be a three-phase AC motor, it is clear that a different drive control means and drive means, such as a DC control means and motor, could be used in place of three-phase drive control 45 and motor 46.

It is clear that the analog loop circuit 200 used in conjunction with the digital phase servo circuit 100 further serves to minimize the jitter and other fluctuations that may be caused by quantizing noise in the digital phase servo 100.

The described digital servo systems are not limited in use to controlling the rotational phase of the rotary heads of a video tape recorder, but can be used in a variety of other servo control circuits. It is also apparent that many modifications and variations can be made in the disclosed embodiments of this invention by one skilled in the art without departing from the spirit or scope of the invention as defined by the appended claims.

What is claimed is:

1. A servo system for controlling the rotational phase of a rotating body, comprising:
    reference signal source means for supplying reference signals;
    command signal source means for supplying command signals in a predetermined phase relationship to the rotational position of said rotating body;
    phase detecting means for providing a binary signal having only first and second discrete values in dependence upon said reference signals being in leading and lagging phase relation, respectively, to said command signals;
    signal processing means for providing successive rotational phase-correction signals in a first fixed relationship to said command signals in dependence upon one of said discrete values of said binary signal from said phase detecting means;
    means responsive to said rotational phase-correction signals for changing the rotation phase of said rotating body; and
    means for prolonging the interval between said successive rotational phase-correction signals to a second longer fixed relationship to said command signals in dependence upon alternations of said binary signal between said first and said second discrete values.

2. A servo system according to claim 1; in which said means for prolonging the interval between successive rotational phase-correction signals is operative in response to a predetermined number of said alterations of said binary signal.

3. A servo system for controlling the rotational phase of a rotating body, comprising:
    reference signal source means for supplying reference signals;
    command signal source means for supplying command signals in a predetermined phase relationship to the rotational position of said rotating body;
    phase detecting means for providing a binary signal in dependence upon the phase relationship between said reference signals and said command signals, said phase detecting means including a first flip-flop which provides a binary signal whenever the phase of said reference signal leads the phase of said command signal, and which provides an inverse binary signal whenever the phase of said reference signal lags the phase of said command signal;
    signal processing means for providing successive rotational phase-correction signals in dependence upon said binary signal from said phase detecting means, said signal processing means including a first AND-circuit providing an advancing phase-correction signal upon coincidence of said binary signal and derivative command signals provided in correspondence to said command signals, and a second AND-circuit providing a retarding phase-correction signal upon coincidence of said inverse binary signal and said derivative command signals; and
    means for prolonging the interval between said successive rotational phase-correction signals in response to a predetermined number of changes of said binary signal.

4. A servo system according to claim 3; in which said means for prolonging the interval between said successive rotational phase correction signals includes frequency-dividing means operative for providing aaid derivative command signal at intervals corresponding to a succession of a predetermined number of said command signals.

5. A servo system according to claim 4; in which said frequency dividing means, when made operative, provides said derivative command signals at intervals corresponding to a succession of a predetermined number of said command signals, and, when made inoperative, provides said derivative command signals at intervals corresponding to said command signals.

6. A servo system according to claim 5; in which said means for prolonging the interval between said successive rotational phase-correction signals further includes means to make operative said frequency dividing means in response to a predetermined number of changes in said binary signal of said first flip-flop.

7. A servo system according to claim 6; in which said means to make operative said frequency dividing means includes a second flip-flop providing a binary output level for making operative said frequency dividing means, said second flip-flop providing said binary output level in response to said predetermined number of changes of said binary signal of said first flip-flop.

8. A servo system according to claim 7; in which said means to make operative said frequency-dividing means includes up-counting means for providing an up-count signal after a predetermined number of changes of said binary signal from said first flip-flop, said up-count signal being applied to set said second flip-flop so as to provide said binary output level of the latter.

9. A servo system according to claim 8; further comprising a differentiation circuit means for providing a signal to said up-counting means whenever said binary signal of said first flip-flop changes.

10. A servo system according to claim 3; in which said means responsive to said rotational phase-correction signals includes:
    up/down counting means for providing a binary count of a predetermined number of digits, said up/down counting means being made to count up in response to said advancing phase-correction signal provided from said AND circuit, and being made to count down in response to said retarding phase-correction signal provided from said second AND circuit;

rotary drive control means for correcting the rotational phase of said rotating body in dependence upon phase-control signals supplied thereto; and variable delay circuit means providing said phase-control signals in correspondence to said binary count of said up/down counting means.

11. A servo system according to claim 10; in which said rotary drive control means includes a loop circuit for controlling the rotational phase of said rotating body by comparing the phase of said phase control signals with the phase of said reference signals.

12. A servo system according to claim 11; in which said loop circuit includes means for producing phase modulated signals in correspondence to the difference between the phase of said control signals and the phase of said reference signals, and means response to said phase modulated signals to control the rotational phase of said rotating body.

13. A servo system according to claim 11; in which said loop circuit includes means for producing a DC level in correspondence to the difference between the phase of said phase-control signals and the phase of said reference signals, and means responsive to said DC level to control the rotational phase of said rotating body.

14. A servo system according to claim 13; in which said means for producing a DC level includes waveshaping means for providing a succession of sloping waveforms in correspondence to said reference signals, means which samples and holds, in response to said phase-control signals, and integrator means providing said DC level corresponding to each sampled segment of said slope portions of the sloping waveforms.

15. A servo system according to claim 14; in which said loop circuit further includes means for producing a phase modulated signal in correspondence to said DC level, and means operative to control the rotational phase of said rotating body in response to said phase modulated signal.

16. A servo system according to claim 15; in which said means for producing a phase modulated signal includes
a variable-frequency oscillator providing an oscillation frequency in dependence upon said DC level; and
means for producing said phase-modulated signal in dependence upon said oscillation frequency.

17. A servo system according to claim 16; in which a multiple-phase AC rotary drive means is provided for rotating said body; and the rotational phase of said rotary drive means is determined by said phase modulated signal.

18. A servo system for controlling the rotational phase of a rotating body, comprising:
reference signal source means for supplying reference signals;
command signal source means for supplying command signals in a predetermined phase relationship to the rotational position of said rotating body;
phase detecting means for providing a binary signal in dependence upon the phase relationship between said reference signals and said command signals, having a first state when the phase of said reference signal leads the phase of said command signal and a second state when the phase of said command signal leads the phase of said reference signal;
signal processing means for providing successive rotational phase-correction signals in dependence upon said binary signal from said phase-detecting means;
means responsive to said rotational phase-correction signal for changing the rotational phase of said rotating body; and
means for prolonging the interval between said successive rotational phase-correction signals in dependence upon the binary signal provided by said phase-detecting means, said means for prolonging the interval between successive rotational phase-correction signals being operative in response to a change of said binary signal from said first state to said second state and back to said first state.

19. A servo system according to claim 1; in which said rotating body is a rotary transducer coupled to a rotary drive means for recording and/or reproducing video signals on a tape.

20. A servo system according to claim 19; in which said video signals include vertical synchronizing signals, said command signals, upon recording, bear a fixed phase relationship with the rotational phase of said rotary transducer, and said comand signals, upon reproducing, correspond to the vertical synchronizing signals derived from the reproduced video signals.

21. A servo system according to claim 20; in which said reference signals are supplied at a frequency so as to correspond to vertical synchronizing signals included with video signals being recorded or reproduced.

* * * * *